United States Patent
Lee et al.

(10) Patent No.: US 11,067,452 B1
(45) Date of Patent: Jul. 20, 2021

(54) DEVICE AND METHOD FOR TEMPERATURE CORRECTION USING A PROXIMITY SENSOR IN A NON-CONTACT THERMOPILE THERMOMETER

(71) Applicant: Maxim Integrated Products, Inc., San Jose, CA (US)

(72) Inventors: Janice C. Lee, Sunnyvale, CA (US); David Pecoraro, Palo Alto, CA (US); Cheng-Wei Pei, Belmont, CA (US)

(73) Assignee: Maxim Integrated Products, Inc., San Jose, CA (US)

(*) Notice: Subject to any disclaimer, the term of this patent is extended or adjusted under 35 U.S.C. 154(b) by 69 days.

(21) Appl. No.: 14/810,073

(22) Filed: Jul. 27, 2015

Related U.S. Application Data (60) Provisional application No. 62/131,930, filed on Mar. 12, 2015.

(51) Int. Cl.
  *G01J 5/16* (2006.01)
  *G01J 5/02* (2006.01)

(52) U.S. Cl.
  CPC .......... *G01J 5/16* (2013.01); *G01J 5/027* (2013.01)

(58) Field of Classification Search
  CPC .................... G01J 5/16; G01J 5/027
  USPC .................. 374/1, 121, 178; 250/338.1
  See application file for complete search history.

(56) References Cited

U.S. PATENT DOCUMENTS

| | | | | |
|---|---|---|---|---|
| 4,343,182 A | * | 8/1982 | Pompei | G01J 5/02 374/117 |
| 6,297,511 B1 | * | 10/2001 | Syllaios | F41J 2/02 250/493.1 |

(Continued)

FOREIGN PATENT DOCUMENTS

| | | |
|---|---|---|
| CN | 1284162 A | 2/2001 |
| CN | 101563591 A | 10/2009 |

(Continued)

OTHER PUBLICATIONS

International Search Report and Written Opinion dated Jun. 21, 2016 for PCT/US2016/022023.

(Continued)

*Primary Examiner* — Brandi N Hopkins
*Assistant Examiner* — Janice M Soto
(74) *Attorney, Agent, or Firm* — Kevin E West; Advent, LLP (57) ABSTRACT

A temperature measurement device having a thermopile temperature sensor and a proximity sensor, a mobile temperature measurement device, and a method for determining a corrected temperature with a temperature measurement device are described. In an implementation, a temperature measurement device includes a semiconductor device; a thermopile temperature sensor disposed on the semiconductor device, where the thermopile temperature sensor is configured to receive radiation from an object; a proximity sensor disposed on the semiconductor device, the proximity sensor configured to detect a distance between the thermopile temperature sensor and the object; and a controller configured determine a corrected temperature measurement using at least an indication of received radiation and an indication of distance between the thermopile temperature sensor and the object.

13 Claims, 7 Drawing Sheets

(56) References Cited

U.S. PATENT DOCUMENTS

| | | |
|---|---|---|
| 9,152,850 B2 | 10/2015 | Mogi |
| 9,307,912 B2 | 4/2016 | Mullin et al. |
| 2005/0105778 A1 | 5/2005 | Sung et al. |
| 2005/0201444 A1* | 9/2005 | Hollander ................. G01J 5/02 374/121 |
| 2006/0062275 A1* | 3/2006 | Teng ........................ G01J 5/02 374/124 |
| 2008/0165620 A1* | 7/2008 | Sugiura ................ G01S 15/025 367/99 |
| 2009/0182526 A1 | 7/2009 | Quinn et al. |
| 2011/0112791 A1 | 5/2011 | Pak et al. |
| 2011/0122251 A1 | 5/2011 | Schmidt |
| 2013/0048855 A1 | 2/2013 | Abreo |
| 2013/0188058 A1* | 7/2013 | Nguyen .................... G01J 5/02 348/164 |
| 2013/0211766 A1* | 8/2013 | Rosenberg ........... G01B 21/042 702/97 |
| 2013/0230074 A1 | 9/2013 | Shin |
| 2014/0046192 A1* | 2/2014 | Mullin ................... H05K 13/00 600/474 |
| 2014/0070078 A1* | 3/2014 | Land ................. H04M 1/72522 250/214.1 |
| 2014/0152772 A1* | 6/2014 | Feyh ..................... G01J 5/0859 348/46 |
| 2014/0152970 A1* | 6/2014 | Wada ................... A61B 5/1076 356/3 |
| 2014/0355649 A1 | 12/2014 | Niederberger et al. |
| 2015/0057561 A1 | 2/2015 | Tal et al. |
| 2015/0265159 A1* | 9/2015 | Lane .................... A61B 5/7278 600/549 |
| 2015/0363928 A1 | 12/2015 | Mestha et al. |

FOREIGN PATENT DOCUMENTS

| | | | | |
|---|---|---|---|---|
| CN | 101839709 A | | 9/2010 | |
| CN | 102706457 A | | 10/2012 | |
| CN | 103188990 A | | 7/2013 | |
| CN | 103250037 A | | 8/2013 | |
| CN | 103282753 A | | 9/2013 | |
| CN | 203287522 U | * | 11/2013 | |
| CN | 203287522 U | | 11/2013 | |
| CN | 10356422 A | | 2/2014 | |
| CN | 103565422 A | * | 2/2014 | |
| CN | 103732133 A | | 4/2014 | |
| EP | 2487895 A2 | | 8/2012 | |
| EP | 2659245 | | 11/2013 | |
| JP | 2013200137 A | | 10/2013 | |
| WO | WO-2012027739 A2 | * | 3/2012 | ................ G01J 5/04 |
| WO | 2012067423 | | 5/2012 | |
| WO | 2012092424 | | 7/2012 | |

OTHER PUBLICATIONS

Office Action for Chinese Application No. 201680021507.2, dated Apr. 2, 2019.
Office Action for Chinese Application No. 201680021507.2, dated Dec. 26, 2019.
Office Action for Chinese Application No. 201680021507.2, dated Aug. 3, 2020.
Office Action for Chinese Application No. 201680021507.2, dated Mar. 30, 2020.
Transmittal of International Preliminary Report on Patentability dated Sep. 21, 2017 for PCT/US2016/022023.

* cited by examiner

DEVICE AND METHOD FOR TEMPERATURE CORRECTION USING A PROXIMITY SENSOR IN A NON-CONTACT THERMOPILE THERMOMETER

BACKGROUND

A thermopile is an electronic device that converts thermal energy into electrical energy. It includes several thermocouples often connected in series or sometimes in parallel. Thermopiles do not respond to absolute temperature, but generate an output voltage proportional to a local temperature difference or a temperature gradient. The output voltage of a thermopile can be in the range of tens or hundreds of millivolts. A thermopile can be used to generate electrical energy from, for instance, heat from electrical components, solar energy, radioactive materials, or combustion.

SUMMARY

A temperature measurement device having a thermopile temperature sensor and a proximity sensor, a mobile temperature measurement device, and a method for determining a corrected temperature with a temperature measurement device are described. In an implementation, a temperature measurement device includes a semiconductor device; a thermopile temperature sensor disposed on the semiconductor device, where the thermopile temperature sensor is configured to receive radiation from an object; a proximity sensor disposed on the semiconductor device, the proximity sensor configured to detect a distance between the thermopile temperature sensor and the object; and a controller configured to receive an indication of received radiation from the object using the thermopile temperature sensor; receive an indication of detected distance between the thermopile temperature sensor and the object using the proximity sensor; determine a corrected temperature measurement using at least the indication of received radiation and the indication of distance between the thermopile temperature sensor and the object; and present the corrected temperature measurement to a user interface, where the controller is communicatively coupled to the thermopile temperature sensor, the proximity sensor, and the user interface.

In an implementation, a mobile temperature measurement device includes a mobile device including a temperature measurement device, which further includes a semiconductor device; a thermopile temperature sensor disposed on the semiconductor device, where the thermopile temperature sensor is configured to receive radiation from an object; a proximity sensor disposed on the semiconductor device, the proximity sensor configured to detect a distance between the thermopile temperature sensor and the object; and a controller configured to receive an indication of received radiation from the object using the thermopile temperature sensor; receive an indication of detected distance between the thermopile temperature sensor and the object using the proximity sensor; determine a corrected temperature measurement using at least the indication of received radiation and the indication of distance between the thermopile temperature sensor and the object; and present the corrected temperature measurement to a user interface, where the controller is communicatively coupled to the thermopile temperature sensor, the proximity sensor, and the user interface.

In an implementation, a method for determining a corrected temperature with a temperature measurement device includes receiving radiation from an object using a thermopile temperature sensor; detecting a distance between the thermopile temperature sensor and the object using a proximity sensor; and using a controller to determine a corrected temperature measurement using received radiation from the object and the distance between the thermopile temperature sensor and the object, where the controller is communicatively coupled to the thermopile temperature sensor and the proximity sensor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Overview

Many devices, for example a thermopile device, use infrared (IR) radiation to measure an object's temperature. A thermopile device can include an electronic device that detects thermal or infrared energy and converts the energy into electrical energy, which can be correlated to a temperature. A thermopile can include several thermocouples connected in series or sometimes in parallel. One example of a thermopile device can include a non-contact thermopile temperature sensor used in a mobile device (e.g., a smartphone). However, radiation detected by a thermopile temperature sensor and an accurate corresponding temperature measurement is dependent on the distance between the object being measured and the thermopile temperature sensor due to a different geometric view factor. As the thermopile temperature sensor is moved to different distances from a source of radiation, the amount of radiation received by the thermopile temperature sensor and resulting indication of temperature varies.

One equation that illustrates the dependence on distance between the measured object and a thermopile detector for accurate temperature measurement includes Equation 1 below. Equation 1, which defines power (P) detected by a thermopile temperature sensor, depends on the temperature of an object being measured ($T_s$), the area of the object ($A_s$), and the geometric view factor $$\left(\frac{A_d \cos(\theta_d)\cos(\theta_s)}{\pi d^2}\right),$$

which further depends upon the angle of the object surface to the detector ($\theta_s$) and the angle of the detector surface from the object ($\theta_d$).

$$P = \frac{\sigma T_s^4}{\pi} A_s \cos(\theta_s) \frac{A_d \cos(\theta_d)}{d^2} \qquad \text{Equation 1}$$

In Equation 1, P is the power detected by a thermopile sensor, $T_s$ is the object temperature, $A_s$ is the object area being measured, $A_d$ is the detector area, d is the distance from the object and the detector, $\theta_s$ is the angle of the object surface to the detector, and $\theta_d$ is the angle of the detector surface from the object. Variations in the above factors (including distance d) may cause an inaccurate radiation power measurement by a thermopile and, consequently, an inaccurate corresponding temperature measurement. Additionally, a user holding a temperature sensor in a non-steady position (e.g., due to non-precise human motion) may lead to a fluctuating temperature readout resulting from the continuous distance variation.

Accordingly, a temperature measurement device having a thermopile temperature sensor and a proximity sensor, a mobile temperature measurement device, and a method for determining a corrected temperature with a temperature measurement device are described. In an implementation, a temperature measurement device includes a semiconductor device; a thermopile temperature sensor disposed on the semiconductor device, where the thermopile temperature sensor is configured to receive radiation from an object; a proximity sensor disposed on the semiconductor device, the proximity sensor configured to detect a distance between the thermopile temperature sensor and the object; and a controller configured to receive an indication of received radiation from the object using the thermopile temperature sensor; receive an indication of detected distance between the thermopile temperature sensor and the object using the proximity sensor; determine a corrected temperature measurement using at least the indication of received radiation and the indication of distance between the thermopile temperature sensor and the object; and present the corrected temperature measurement to a user interface, where the controller is communicatively coupled to the thermopile temperature sensor, the proximity sensor, and the user interface.

In an implementation, a mobile temperature measurement device includes a mobile device including a temperature measurement device, which further includes a semiconductor device; a thermopile temperature sensor disposed on the semiconductor device, where the thermopile temperature sensor is configured to receive radiation from an object; a proximity sensor disposed on the semiconductor device, the proximity sensor configured to detect a distance between the thermopile temperature sensor and the object; and a controller configured to receive an indication of received radiation from the object using the thermopile temperature sensor; receive an indication of detected distance between the thermopile temperature sensor and the object using the proximity sensor; determine a corrected temperature measurement using at least the indication of received radiation and the indication of distance between the thermopile temperature sensor and the object; and present the corrected temperature measurement to a user interface, where the controller is communicatively coupled to the thermopile temperature sensor, the proximity sensor, and the user interface.

In an implementation, a method for determining a corrected temperature with a temperature measurement device includes receiving radiation from an object using a thermopile temperature sensor; detecting a distance between the thermopile temperature sensor and the object using a proximity sensor; and using a controller to determine a corrected temperature measurement using received radiation from the object and the distance between the thermopile temperature sensor and the object, where the controller is communicatively coupled to the thermopile temperature sensor and the proximity sensor.

The temperature measurement device, the mobile temperature measurement device, and the method for determining a corrected temperature using the temperature measurement device provide an accurate temperature measurement by using a correction based on the distance between an object and energy received from the object by the temperature measurement device.

Example Implementations

FIGS. 1A through 2C illustrate a temperature measurement device 100 and/or a mobile temperature measurement device 132 in accordance with an example implementation of the present disclosure. The temperature measurement device 100 can include a semiconductor device 102, a thermopile temperature sensor 104, a proximity sensor 108, and/or a controller 122. In implementations, the temperature measurement device 100 may be included as a part of a mobile temperature measurement device 132, such as a mobile device, a smartphone, etc., a wearable, a tablet computer, and/or within a mobile device, a smartphone, etc. In a specific example, the mobile temperature measurement device 132 can include a smartphone having capability to measure an individual's temperature. It is contemplated that the temperature measurement device 100 and/or the mobile temperature measurement device 132 may include other devices, components, and/or form factors. For example, the mobile temperature measurement device 132 may include an outer case and/or housing configured to protect the temperature measurement device 100. The temperature measurement device 100 and/or the mobile temperature measurement device 132 may be configured to be relatively small and mobile (e.g., weighing less than 2 pounds) while providing a corrected temperature measurement.

Figure 1A:
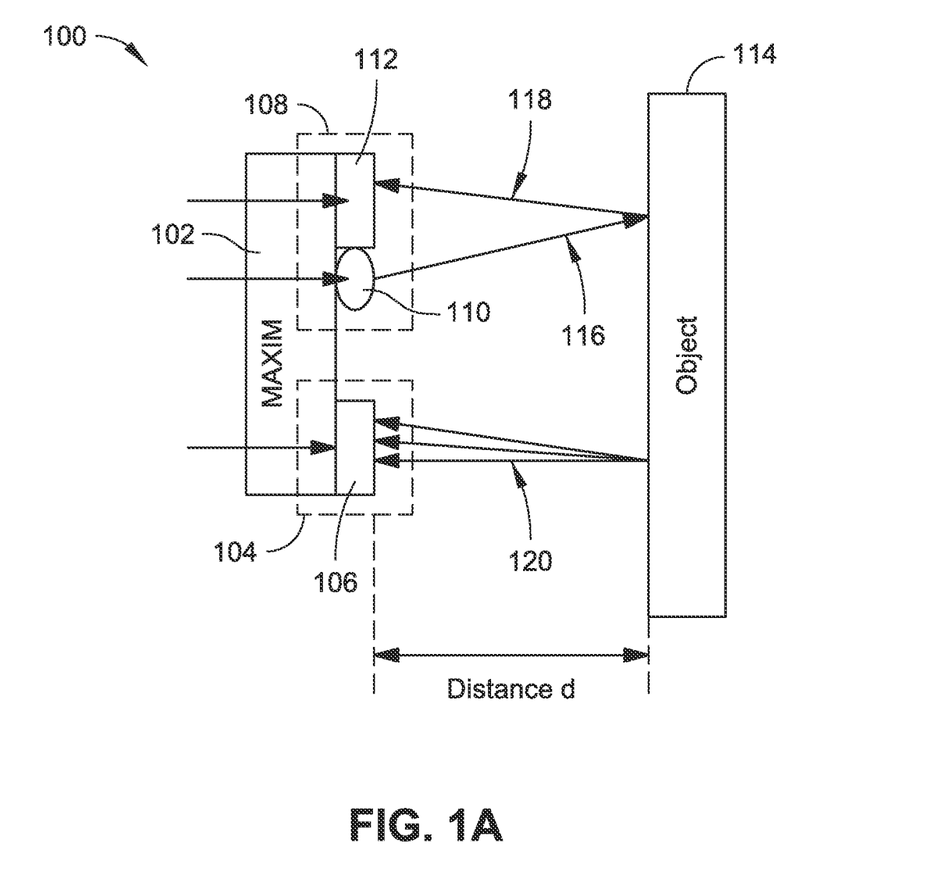
FIG. 1A is an environmental view illustrating a temperature measurement device having a thermopile temperature sensor and proximity device for providing a corrected temperature, in accordance with an example implementation of the present disclosure.

As illustrated in FIG. 1A, the temperature measurement device 100 can include a semiconductor device 102. In implementations, a semiconductor device 102 may include an electronic component that uses the electronic properties of a semiconductor material, such as silicon, germanium, and gallium arsenide, as well as organic semiconductors. It is also contemplated that a semiconductor device 102 may include a non-semiconductor material configured to support a semiconductor device 102 (e.g., a polymer substrate, a fiberglass substrate, etc.). One example of a semiconductor device 102 can include an integrated circuit chip. Another example of a semiconductor device 102 can include a wafer and/or a carrier substrate. In embodiments, the semiconductor device 102 may include a semiconductor package and/or a portion of a semiconductor wafer substrate, such as a silicon wafer (e.g., p-type wafer, n-type wafer, and so forth), a germanium wafer, and so forth, that includes one or more integrated circuits formed therein. The integrated circuits may be formed through suitable front-end-of-line (FEOL) fabrication techniques near the surface of the semiconductor wafer substrate or semiconductor device 102. In various implementations, the integrated circuits may include digital integrated circuits, analog integrated circuits, mixed signal integrated circuits, combinations thereof, and so forth. In a specific implementation, the semiconductor device 102 can include a silicon substrate that is configured to mechanically and/or electrically support a proximity sensor 108 and a thermopile temperature sensor 104.

The temperature measurement device 100 can include a thermopile temperature sensor 104 as shown in FIG. 1A. In this embodiment, the thermopile temperature sensor 104 can be mechanically and/or electronically coupled to the semiconductor device 102. In one specific example, the thermopile temperature sensor 104 can be coupled to a surface of the semiconductor device 102 and adjacent to a proximity sensor 108. The thermopile temperature sensor 104 can be configured to be exposed to radiation from an object 114 (e.g., disposed proximate and/or as part of an outer edge or surface of the temperature measurement device 100) and may include a non-contact thermopile temperature sensor 104. In implementations, the thermopile temperature sensor 104 may be accurate to within 0.2° C. Additionally, in some instances, the thermopile temperature sensor 104 may be in-situ calibratable.

The thermopile temperature sensor 104 can further include a thermopile 106. A thermopile 106 can include multiple thermocouples or temperature sensors connected in series and/or in parallel. In a specific embodiment, thermopile 106 can include a thermopile disposed proximate to a surface of the temperature measurement device 100. In this embodiment, the thermopile 106 may be configured to detect a temperature by receiving radiation and/or energy from an object 114 that is external the temperature measurement device 100. For example, the thermopile 106 can be configured to detect infrared radiation from an object 114 (e.g., from a human, an engine, a heater vent, a furnace, etc.). In this example, the thermopile 106 and/or the temperature measurement device 100 may be placed proximate (e.g., close enough to detect energy and/or radiation) to the object 114 for detecting the infrared radiation. In embodiments, the temperature measurement device 100 may be placed at various distances from the object 114 depending on the object 114. Additionally, the thermopile temperature sensor 104 and/or thermopile 106 may be configured to have a specific field-of-view, which can include the extent of the external environment that the thermopile 106 is exposed. For example, the thermopile 106 can have a 45° (+/−22.5°) field of view. It is contemplated that the thermopile 106 may have other degrees of field of view (e.g., 25°, 30°, 35°, 40°, 50°, 55°, 60°, 65°, etc.).

As shown in in FIG. 1A, the temperature measurement device 100 can include a proximity sensor 108, which can further include a light source 110 and a light sensor 112. In some implementations, the proximity sensor 108 can be configured to be calibrated to measure a specific object 114 surface (e.g., a human forehead) and/or specific characteristic (e.g., reflectivity, texture, color, and/or hue, etc.). In other implementations, the proximity sensor 108 may be configured to be independent of the surface, form, and/or type of the object 114. For example, the proximity sensor 108 may be configured to provide a correct distance whether the object is a human forehead or an article of clothing. In this example, the proximity sensor 108 may utilize different technologies or combinations of technologies for providing the correct distance, such as utilizing time-of-flight, the size and/or intensity of the reflected signal, etc. It is contemplated that other types of proximity sensors 108 may be utilized to detect distance between the object 114 and the temperature measurement device 100. Some examples may include a capacitive proximity sensor, an ultrasonic distance detector, an RF time-of-flight proximity sensor, an optical time-of-flight proximity sensor, a laser-based (LIDAR) proximity sensor, and/or other optical and/or electrical means for determining a distance. Additionally, in some instances, the proximity sensor 108 may be in-situ calibratable.

In some implementations, the light source 110 may be configured to emit electromagnetic radiation in a limited spectrum of wavelengths. In implementations, light source 110 can include various types of illumination sources, such as a light-emitting diode (LED) and/or an infrared light emitting diode (e.g., an IR-LED configured to emit electromagnetic radiation in the infrared light spectrum). The infrared light spectrum includes electromagnetic radiation that ranges in wavelength from approximately seven hundred (700) nanometers to approximately three hundred thousand (300,000) nanometers. The light source 110 may also be configured to emit electromagnetic radiation in a known, predetermined pattern (e.g., emits a square wave of known width and frequency for a predetermined time). The light source 110 can be configured to illuminate at least part of an object 114 with transmitted energy 116 (e.g., infrared radiation) such that the transmitted energy 116 can be reflected and a light sensor 112 can detect the reflected energy 118. In one embodiment, the light source 110 for the temperature measurement device 100 may be disposed adjacent to the thermopile temperature sensor 104. In some embodiments, the light source 110 can be configured such that transmitted energy 116 from the light source 110 can be transmitted through a pinhole or other aperture in the temperature measurement device 100. In one specific embodiment, a light source 110 including an IR-LED can transmit light (e.g., transmitted energy 116) to a person's forehead, for example, for determining a distance from the temperature measurement device 100 to the object. It is contemplated that the light source 110 can be configured to illuminate and/or transmit light/energy to other types of objects 114.

As shown in in FIG. 1A, the proximity sensor 108 can include a light sensor 112. The light sensor 112 can be configured to detect electromagnetic radiation in the spectrum of wavelengths emitted by the light source 110 (e.g., transmitted light 116) and/or reflected (e.g., reflected energy 118) by an object in close proximity to the temperature measurement device 100 and/or light source 110. For instance, where the light source 110 includes an IR-LED, the light sensor 112 may be configured to detect electromagnetic radiation at least within the infrared light spectrum. In implementations, the light sensor 112 may include a photodetector (e.g., a photodiode, a phototransistor, etc.), that converts received electromagnetic radiation in the spectrum of wavelengths (e.g., infrared, visible, etc.) emitted by the light source 110 into an electrical signal (e.g., a current or voltage). In additional embodiments, the light sensor 122 may include a single-element/pixel sensor and/or a multi-element array sensor (e.g., a CMOS imager), which can be used to determine the distance from multiple objects 114 within the light sensor 122 field of view. The light sensor 112 may further be configured to detect the ambient light environment surrounding the temperature measurement device 100. For example, the light sensor 112 may detect electromagnetic radiation occurring in the visible light spectrum (e.g., electromagnetic radiation having a wavelength ranging from approximately three hundred and ninety (390) nanometers to approximately seven hundred and fifty (750) nanometers) incident on the light sensor 112. Thus, the light sensor 112 may be configured to detect electromagnetic radiation occurring in both the infrared light spectrum and the visible light spectrum that is incident on the light sensor 112. Additionally, the light source 110 and/or light sensor 112 may be configured to have a specific field-of-view, which can include the extent of the external environment that the light source 110 and/or light sensor 112 is exposed. For example, the light source 110 and/or light sensor 112 can have a 45° field of view. It is contemplated that the light source 110 and/or light sensor 112 may have other degrees of field of view (e.g., 25°, 30°, 35°, 40°, 50°, 55°, 60°, 65°, etc.).

Figure 1B:
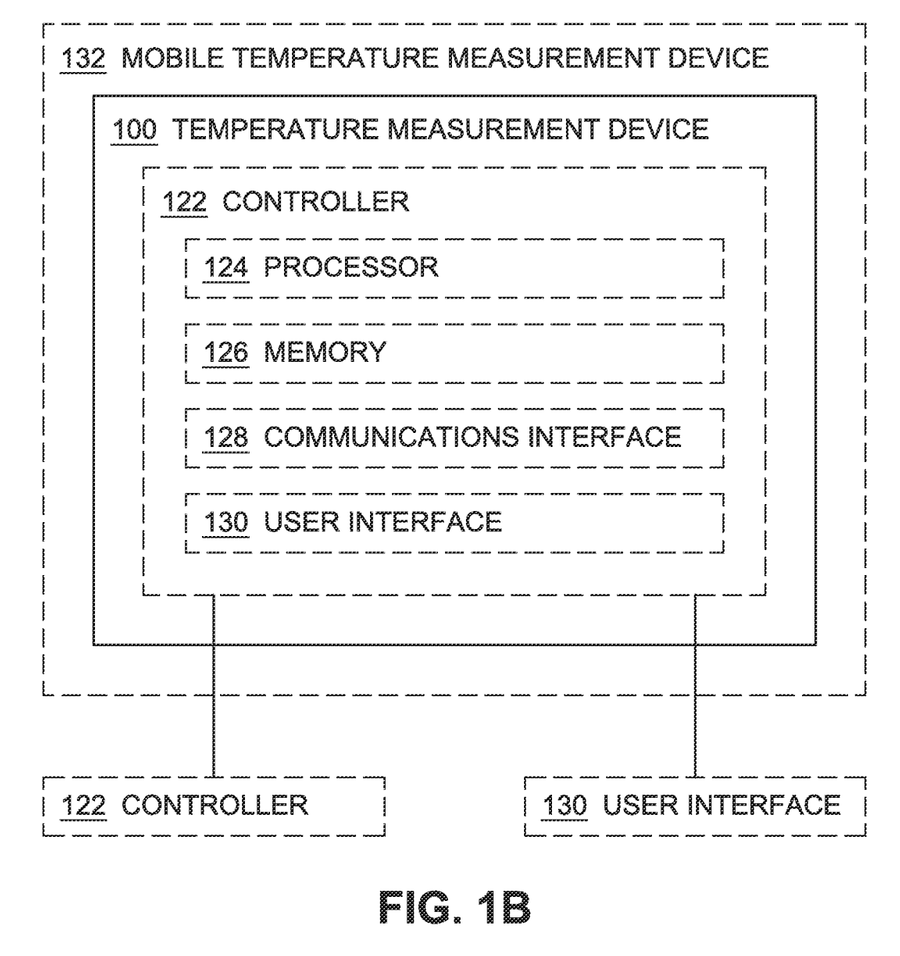
FIG. 1B is an environmental view illustrating the temperature measurement device shown in FIG. 1A with an exemplary controller, in accordance with an example implementation of the present disclosure.

Referring to FIGS. 1A and 1B, a temperature measurement device 100 and/or mobile temperature measurement device 132, including some or all components, can operate under computer control. For example, a processor 124 can be included with or in a temperature measurement device 100 and/or controller 122 to control the components and functions of temperature measurement device 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the temperature measurement device 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

Illustrated in FIG. 1B, the semiconductor device 102, thermopile temperature sensor 104, and/or proximity sensor 108 can be coupled with a controller 122 for controlling the temperature measurement device 100. The controller 122 can include a processor 124, a memory 126, and a communications interface 128. In some embodiments, the controller 122 may be integrated into an integrated circuit (IC) with a user interface 130 (e.g., controls, a readout, etc.) for the proximity sensor 108 and/or thermopile temperature sensor 104. In other embodiment, the controller 122, processor 124, memory 126, communications interface 128, and/or user interface 130 may be integrated into one system-in-package/module and/or one or more could be separate discrete components in an end system (e.g., temperature measurement device 100).

The processor 124 provides processing functionality for the temperature measurement device 100/controller 122 and can include any number of processors, micro-controllers, or other processing systems, and resident or external memory for storing data and other information accessed or generated by the temperature measurement device 100/controller 122. The processor 124 can execute one or more software programs that implement techniques described herein. The processor 124 is not limited by the materials from which it is formed or the processing mechanisms employed therein and, as such, can be implemented via semiconductor(s) and/or transistors (e.g., using electronic integrated circuit (IC) components), and so forth.

The controller 122 may include a memory 126. The memory 126 can be an example of tangible, computer-readable storage medium that provides storage functionality to store various data associated with operation of the temperature measurement device 100/controller 122, such as software programs and/or code segments, or other data to instruct the processor 124, and possibly other components of the temperature measurement device 100/controller 122, to perform the functionality described herein. Thus, the memory 126 can store data, such as a program of instructions for operating the temperature measurement device 100 (including its components), and so forth. It should be noted that while a single memory 126 is described, a wide variety of types and combinations of memory (e.g., tangible, non-transitory memory) can be employed. The memory 126 can be integral with the processor 124, can comprise stand-alone memory, or can be a combination of both.

The memory 126 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the temperature measurement device 100 and/or the memory 126 can include removable integrated circuit card (ICC) memory, such as memory provided by a subscriber identity module (SIM) card, a universal subscriber identity module (USIM) card, a universal integrated circuit card (UICC), and so on.

The controller 122 may include a communications interface 128. The communications interface 128 can be operatively configured to communicate with components of the temperature measurement device 100. For example, the communications interface 128 can be configured to transmit data for storage in the temperature measurement device 100, retrieve data from storage in the temperature measurement device 100, and so forth. The communications interface 128 can also be communicatively coupled with the processor 124 to facilitate data transfer between components of the temperature measurement device 100 and the processor 124 (e.g., for communicating inputs to the processor 124 received from a device communicatively coupled with the temperature measurement device 100/controller 122). It should be noted that while the communications interface 128 is described as a component of a temperature measurement device 100/controller 122, one or more components of the communications interface 128 can be implemented as external components communicatively coupled to the temperature measurement device 100 via a wired and/or wireless connection. The temperature measurement device 100 can also comprise and/or connect to one or more input/output (I/O) devices (e.g., via the communications interface 128), including, but not necessarily limited to: a display, a mouse, a touchpad, a keyboard, and so on.

The communications interface 128 and/or the processor 124 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 128 can be configured to communicate with a single network or multiple networks across different access points.

Generally, any of the functions described herein can be implemented using hardware (e.g., fixed logic circuitry such as integrated circuits), software, firmware, manual processing, or a combination thereof. Thus, the blocks discussed in this disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

As shown in in FIG. 1B, the temperature measurement device 100 may include a user interface 130. In implementations, a user interface 130 can include a device configured to display information to a user. Some examples of a user interface 130 can include a display screen and/or a touch screen. In one specific embodiment, a user interface 130 can include a touch screen that is coupled to controller 122 and is configured to present information to a user, such as a corrected temperature measure of the object 114 by the thermopile 106 and/or thermopile temperature sensor 104. In this specific embodiment, the user interface 130 may also receive input from a user and transmit the input to the controller 122.

Figure 2A:
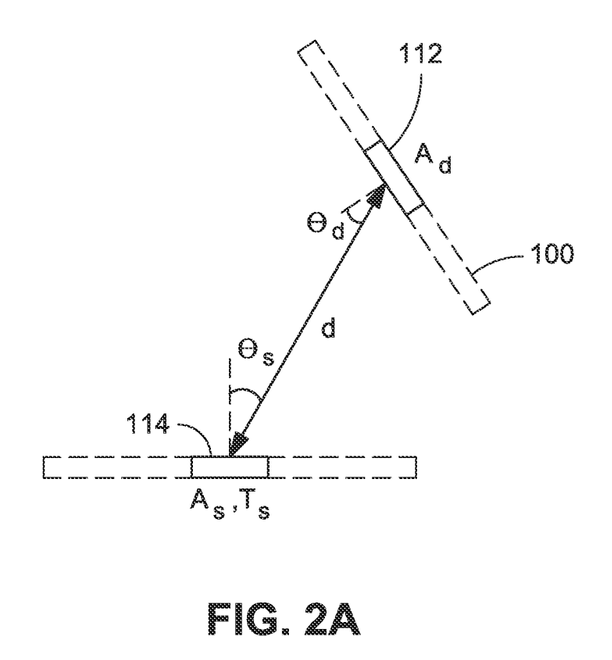
FIG. 2A is an environmental view illustrating the dependence of thermopile temperature measurement upon distance between the thermopile and the object being measured, in accordance with an example implementation of the present disclosure.

In embodiments, as described above, the mobile temperature measurement device 132 and/or the temperature measurement device 100, including a thermopile temperature sensor 104 and proximity sensor 108, can be used to measure a temperature of an object 114 and provide a corrected temperature based on the distance between the thermopile temperature sensor 104 and the object 114. FIG. 2A illustrates one temperature measurement device 100 and object 114 configuration using Equation 1 below, which further illustrates the amount of detected power (e.g., infrared) for a temperature measurement device 100. Equation 1 shows that power (P) is a function of the geometric solid angle $$\left(\frac{A_d \cos(\theta_d)}{d^2}\right)$$

subtended by the object 114. The solid angle $$\left(\frac{A_d \cos(\theta_d)}{d^2}\right)$$

in turn depends on the distance (d) between the object and the sensor.

$$P = \frac{\sigma T_s^4}{\pi} A_s \cos(\theta_s) \frac{A_d \cos(\theta_d)}{d^2} \qquad \text{Equation 1}$$

Figure 2B:
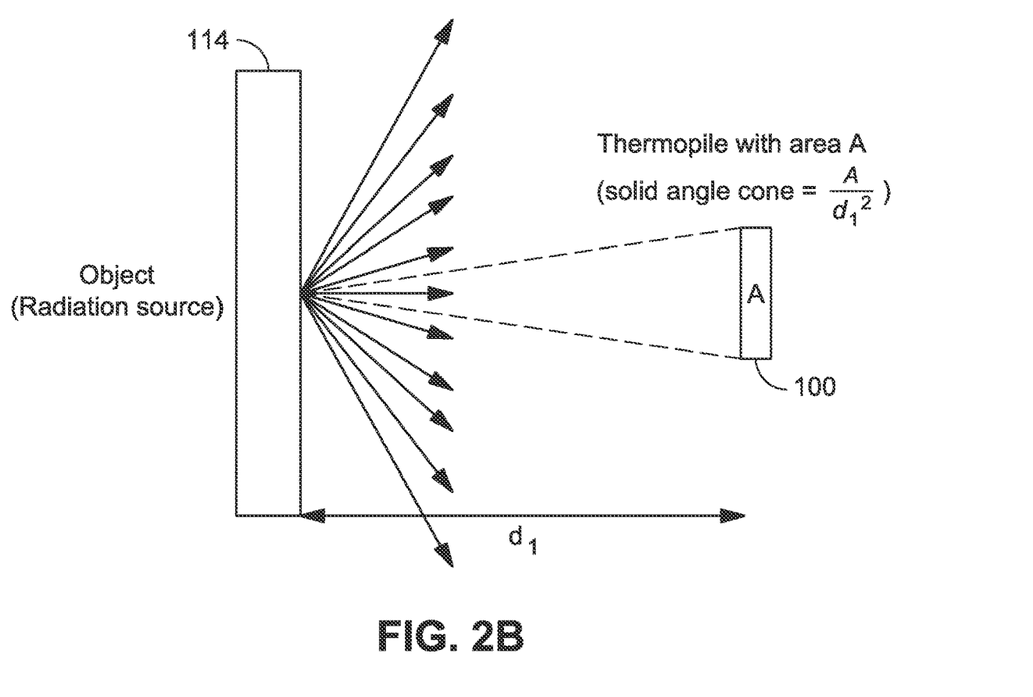
FIG. 2B is an environmental view illustrating the dependence of thermopile temperature measurement upon distance between the thermopile and the object being measured, in accordance with an example implementation of the present disclosure.
Figure 2C:
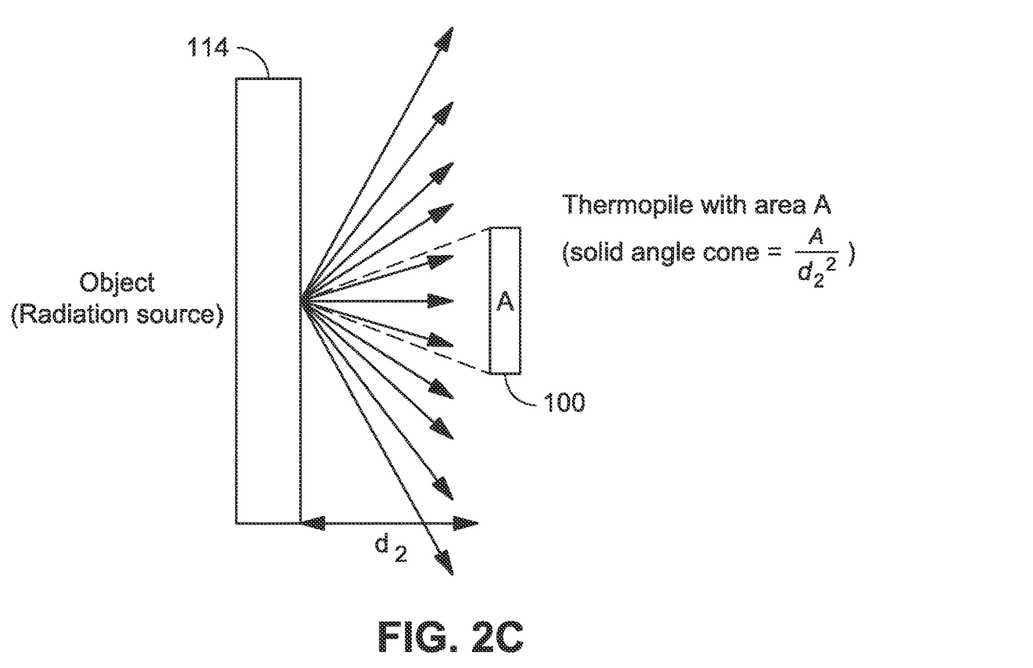
FIG. 2C is an environmental view illustrating the dependence of thermopile temperature measurement upon distance between the thermopile and the object being measured, in accordance with an example implementation of the present disclosure.

FIGS. 2B and 2C illustrate how an object at a far distance (shown in FIG. 2B) subtends a smaller solid angle than an object at a near distance (shown in FIG. 2C). For example, when the object 114 is far from the temperature measurement device 100 (see FIG. 2B), less detected infrared power from the object 114 (because of a smaller solid angle subtended by the sensor) may result in less energy/radiation received and a lower temperature readout than when the object 114 is nearer to the temperature measurement device 100 (see FIG. 2C), even though the temperature of the object 114 in both instances may be the same. In this example, an object farther than an actual calibration distance will read a colder temperature than the true calibrated value, while any object closer than the actual calibration distance will read a higher temperature than the true calibrated value.

Figure 3A:
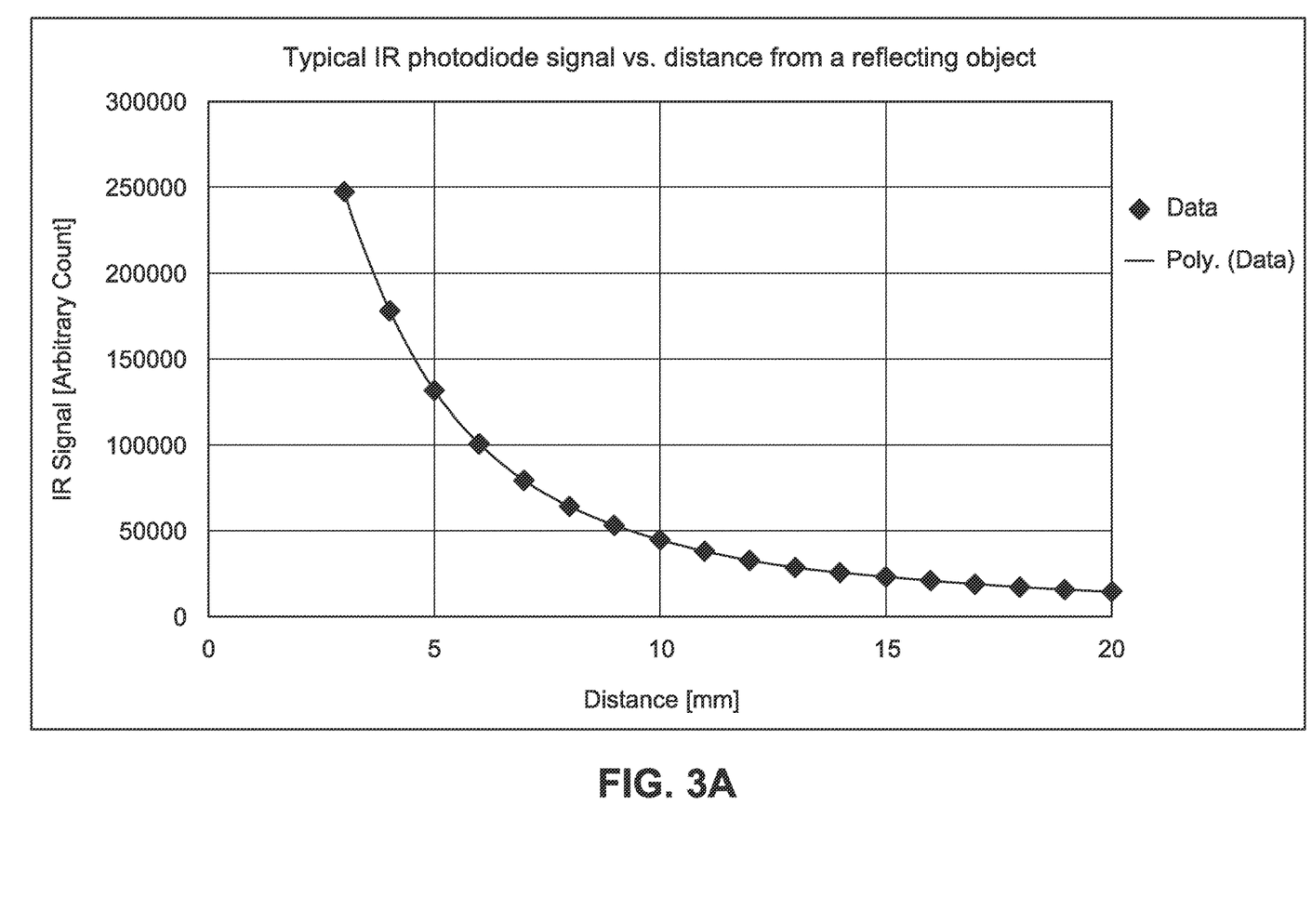
FIG. 3A is a graphical depiction illustrating an exemplary photodiode signal in relation to a distance between a photodiode and the object being measured, in accordance with an example implementation of the present disclosure.

FIG. 3A illustrates data from one empirical embodiment of a temperature measurement device 100 with a thermopile temperature sensor 104 and proximity sensor 108 including an infrared photodiode and a specific graphical depiction of an infrared photodiode signal count vs. distance of the infrared photodiode from an object 114 with a constant temperature. In this implementation, the IR signal was recorded from the IR proximity sensor as a function of distance. FIG. 3A shows that for a single object 114 with a constant temperature, a farther distance between the object 114 and the thermopile temperature sensor 104 results in less power detected (e.g., less counts detected by the thermopile temperature sensor 104), and a nearer distance between the object 114 and the thermopile temperature sensor 104 results in more power detected (e.g., more counts detected by the thermopile temperature sensor 104) for the same object 114 temperature.

Figure 3B:
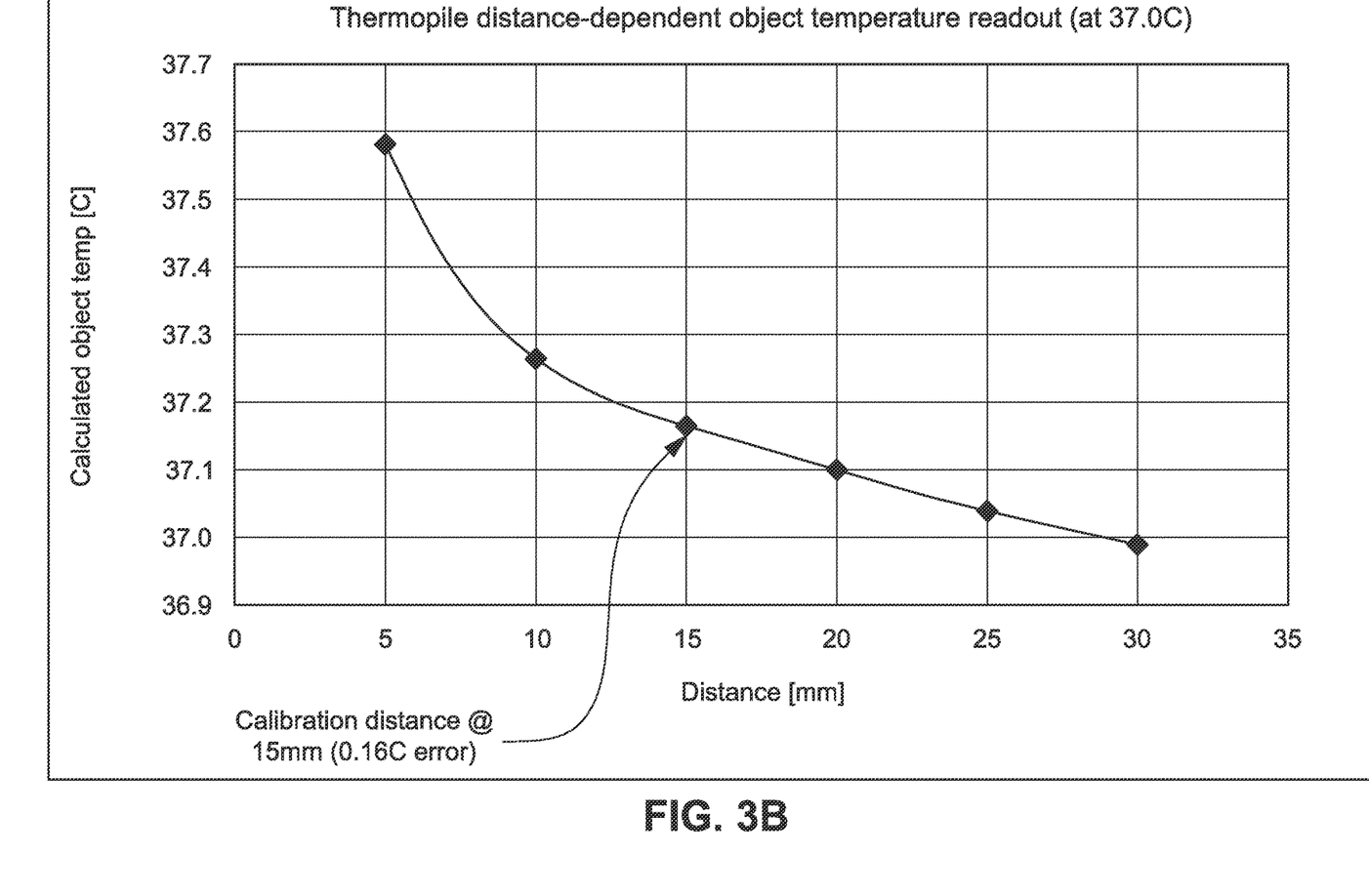
FIG. 3B is a graphical depiction illustrating an exemplary measured temperature in relation to a distance between a measuring thermopile and the object being measured, in accordance with an example implementation of the present disclosure.

FIG. 3B illustrates one specific implementation where a thermopile 106 was calibrated at a distance of 15 mm against a blackbody (e.g., object 114) at 37° C. and used to measure the blackbody at varying distance. The data illustrated in FIG. 3B further illustrates that an accurate temperature reading is dependent on distance between the temperature measurement device 100 and the object 114. For example, when the temperature measurement device 100 is at a distance of 15 mm from the object 114, the temperature is measured as about 37.16° C. (an error of about 0.16° C. was determined). However, at a distance of 5 mm, a temperature of about 37.6° C. was measured, and at a distance of 30 mm, a temperature of about 37.0° C. was measured (both greater than an often acceptable limit of ±0.2° C.). It is contemplated that other distance calibration(s) and implementations for calculating the temperature of an object based on distance from the object to the temperature measurement device 100 may be utilized. For example, the actual functional form and/or trend of the distance dependence can be different than that shown in FIG. 3B (or the other implementations illustrated herein) due to different temperature measurement device 100 design (e.g., aperture size, etc.). Additionally, the actual absolute temperature error (the y-axis shown in FIG. 3B may also be different at least partially based on the accuracy of the thermopile calibration. In implementations, the distance dependence of the object temperature is not restricted to that shown in FIG. 3B.

Using a proximity sensor 108 and a controller 122 to determine a distance between temperature measurement device 100 and the object 114 and a temperature correction factor can provide a corrected temperature measurement accounting for distance. If the temperature measurement device 100 is trimmed (e.g., calibrating units during mass production to behave identically) and calibrated correctly, a curve, such as the graphical depictions shown in FIGS. 3A and/or 3B, can be used by controller 122 to correct a detected temperature by subtracting a characterized distance dependence from the actual temperature measurement resulting in a more accurate corrected temperature.

Example Processes

Figure 4:
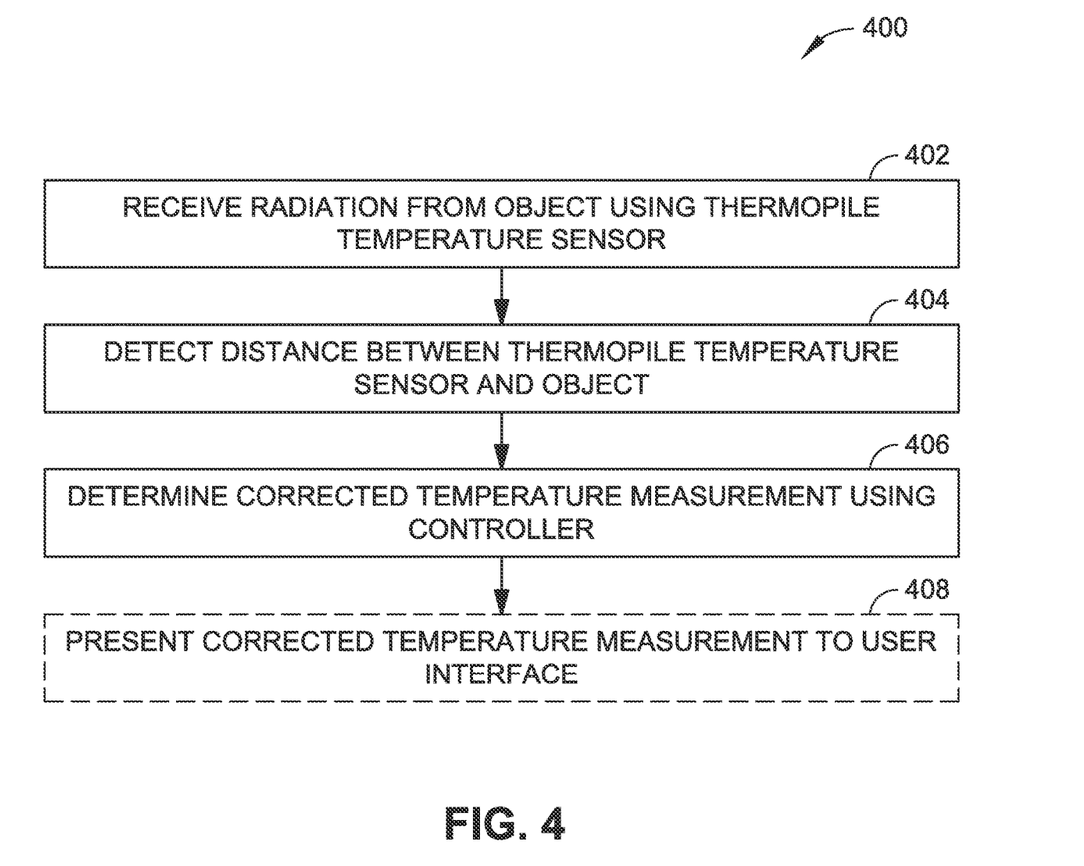
FIG. 4 is a flow diagram illustrating a process in an example implementation for using a temperature measurement device, such as the temperature measurement device shown in FIGS. 1A and 1B, in accordance with an example implementation of the present disclosure.

The following discussion describes example techniques for determining a corrected temperature accounting for distance using a temperature measurement device, such as the temperature measurement device 100 shown in FIGS. 1A and 1B. FIG. 4 depicts an example process 400 for using a temperature measurement device 100 with a proximity sensor 108 and a thermopile temperature sensor 104 to determine a corrected temperature measurement.

As shown in FIG. 4, radiation is received from an object using a thermopile temperature sensor (Block 402). In implementations, receiving radiation from an object 114 can include using a thermopile temperature sensor 104 to receive/detect radiation (e.g., reflected energy 118) from the object 114. In one example, a user can input a command to a user interface 130 and/or controller 122 that initiates a thermopile temperature sensor 104, which then detects and/or receives radiation (e.g., infrared radiation, visible light, etc.).

A distance between the thermopile temperature sensor and the object is detected using a proximity sensor (Block 404). In an implementation, detecting a distance between the thermopile temperature sensor 104 and an object 114 can include using a proximity sensor 108 to detect/determine the distance. In this implementation, controller 122 can initiate and/or cause the proximity sensor 108 to detect the distance d. In an example, the proximity sensor 108 can transmit light and/or infrared radiation (e.g., transmitted energy 116) using light source 110 and can receive reflected energy 118 using light sensor 112. In some implementations, the thermopile temperature sensor 104 may detect temperature prior to the proximity sensor 108 determining a distance between the temperature measurement device 100 and object 114. In other implementations, the thermopile temperature sensor 104 may detect temperature subsequent or simultaneously to the proximity sensor 108 determining a distance between the temperature measurement device 100 and object 114. In some implementations, controller 122 may determine the distance based at least upon the time delay from transmitting the light and/or infrared radiation from light source 110 and receiving and/or detecting the reflected energy 118 from the object 114 using light sensor 112. In some implementations, detecting the distance between the object 114 and the temperature measurement device 100 may include using controller 122 to determine the distance based at least upon the size and/or magnitude of the reflected infrared signal. It is contemplated that detecting the distance d may include using other means, such as using an ultrasonic detector.

Then, a corrected temperature measurement is determined using a controller (Block 406). In implementations, determining a corrected temperature measurement can include using controller 122 to compare actual radiation detected by the thermopile temperature sensor 104 and a distance determined by proximity sensor 108. In these implementations, the controller 122 can subtract and/or adjust a characterized distance dependence (e.g., determined from empirical data) from the actual temperature measurement resulting in a more accurate corrected temperature. A characterized distance dependence may be obtained from experimental data, such as the exemplary data shown in FIGS. 3A and 3B. In an embodiment, controller 122 and/or memory 126 can include data including characterized distance dependence information. Additionally, controller 122 may be pre-calibrated with thermopile temperature sensor 104 information, proximity sensor 108 information, and/or predetermined distance information. In an additional embodiment, determining a corrected temperature may include performing an in-situ calibration by a user (e.g., using a polynomial functional form, requiring user to capture IR signal at a close and far distances only). Determining a corrected temperature may include providing feedback to the controller 122, which can include user input and/or other input (e.g., input from an external source, such as a firmware update) and can serve to improve the capability of the controller 122 to provide a corrected temperature.

Then, a corrected temperature measurement may be presented to a user interface (Block 408). In implementations, presenting the corrected temperature measurement to a user interface 130 can include using controller 122 to present the determined corrected temperature and/or other information (e.g., distance between the object 114 and temperature measurement device 100, thermopile temperature sensor 104 field-of-view, etc.) to the user interface 130, such as a display screen disposed as a component of the temperature measurement device 100.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A temperature measurement device, comprising:
   a semiconductor device;
      a non-contact thermopile temperature sensor disposed on the semiconductor device, where the non-contact thermopile temperature sensor is configured to receive radiation from an object while located at a distance therefrom;
      a proximity sensor disposed on the semiconductor device, the proximity sensor configured to detect the distance between the non-contact thermopile temperature sensor and the object, the proximity sensor including a light source and a light sensor, wherein the light source is configured to illuminate at least part of the object with transmitted energy and the light sensor is configured to detect reflected energy from the object, the proximity sensor being configured to be calibrated to detect the distance to the object, an outward surface of each of the light sensor and the non-contact thermopile temperature sensor being co-planar with one another and thus configured to be a same distance from the object; and
      a controller configured to
         receive an indication of a power of received radiation from the object using the non-contact thermopile temperature sensor;
         receive an indication of detected distance between the non-contact thermopile temperature sensor and the object using the proximity sensor;
         determine a corrected temperature measurement using at least the indication of the power of received radiation and the indication of distance between the non-contact thermopile temperature sensor and the object; and
         present the corrected temperature measurement to a user interface,
      where the controller is communicatively coupled to the non-contact thermopile temperature sensor, the proximity sensor, and the user interface.

2. The temperature measurement device of claim 1, where the temperature measurement device is pre-calibrated for the corrected temperature measurement based on object distance and received radiation.

3. The temperature measurement device of claim 1, where the semiconductor device includes an integrated circuit chip.

4. The temperature measurement device of claim 1, where the thermopile temperature sensor is accurate to within 0.2° C.

5. The temperature measurement device of claim 1, where the thermopile temperature sensor is in-situ calibratable.

6. The temperature measurement device of claim 1, where the proximity sensor is in-situ calibratable.

7. The temperature measurement device of claim 1, where the proximity sensor includes a light-emitting diode and a photodiode.

8. The temperature measurement device of claim 7, where the light-emitting diode includes an infrared light-emitting diode.

9. The temperature measurement device of claim 1, where the temperature measurement device includes at least one of a smartphone, a wearable, or a tablet computer.

10. The temperature measurement device of claim 1, where the controller and the proximity sensor are configured to measure reflectivity of the object.

11. A mobile temperature measurement device, comprising:
   a smartphone including a temperature measurement device, which further includes
      a semiconductor device;
      a non-contact thermopile temperature sensor disposed on the semiconductor device, where the non-contact thermopile temperature sensor is configured to receive radiation from an object while located at a distance therefrom;
      a proximity sensor disposed on the semiconductor device, the proximity sensor configured to detect a distance between the non-contact thermopile temperature sensor and the object, the proximity sensor including a light source and a light sensor, wherein the light source is configured to illuminate at least part of the object with transmitted energy and the light sensor is configured to detect reflected energy from the object, the proximity sensor being configured to be calibrated to detect the distance to the object, an outward surface of each of the light sensor and the non-contact thermopile temperature sensor being co-planar with one another and thus configured to be a same distance from the object; and
      a controller configured to
         receive an indication of a power of received radiation from the object using the non-contact thermopile temperature sensor;
         receive an indication of detected distance between the non-contact thermopile temperature sensor and the object using the proximity sensor;
         determine a corrected temperature measurement using at least the indication of the power of received radiation, and the indication of distance between the non-contact thermopile temperature sensor and the object; and
         present the corrected temperature measurement to a user interface,
      where the controller is communicatively coupled to the non-contact thermopile temperature sensor, the proximity sensor, and the user interface.

12. The mobile temperature measurement device of claim 11, where the mobile temperature measurement device is pre-calibrated for the corrected temperature measurement based on distance and received radiation.

13. The mobile temperature measurement device of claim 11, where the light-emitting diode includes an infrared light-emitting diode.

* * * * *